United States Patent [19]

Iseman et al.

[11] Patent Number: 5,218,252

[45] Date of Patent: Jun. 8, 1993

[54] DYNAMOELECTRIC MACHINES WITH STATOR POSITIONING

[75] Inventors: Walter J. Iseman, Monroe Center; Tyrone A. Johnsen, Rockford, both of Ill.

[73] Assignee: Sundstrand Corporation, Rockford, Ill.

[21] Appl. No.: 834,043

[22] Filed: Feb. 11, 1992

[51] Int. Cl.$^5$ .............................................. H02K 5/18
[52] U.S. Cl. ........................................ 310/64; 310/89; 310/217; 310/258
[58] Field of Search ............. 310/64, 65, 216, 217, 310/254, 258, 259, 42, 165, 89, 306, 261; 165/81

[56] References Cited

U.S. PATENT DOCUMENTS

| | | | |
|---|---|---|---|
| 2,151,561 | 3/1939 | Morrill | 29/155.5 |
| 2,465,275 | 3/1949 | Rushing | 310/258 |
| 2,491,943 | 12/1949 | Abbott | 310/64 |
| 2,496,507 | 2/1950 | Watkins | 310/258 |
| 2,632,861 | 3/1953 | Morton et al. | 310/258 |
| 2,818,515 | 12/1957 | Dolenc | 310/42 |
| 4,134,036 | 1/1979 | Curtiss | 310/42 |
| 4,514,652 | 4/1985 | Olson | 310/165 |
| 4,520,284 | 5/1985 | Wolcott | 310/42 |
| 4,647,805 | 3/1987 | Flygare | 310/65 |
| 4,663,553 | 5/1987 | Zimmermann | 310/258 |
| 4,673,835 | 6/1987 | Hohnstein | 310/217 |
| 4,762,173 | 8/1988 | Blakely | 165/81 |
| 4,894,574 | 1/1990 | Ragaly | 310/258 |
| 5,072,146 | 12/1991 | New | 310/64 |
| 5,083,052 | 1/1992 | Ochi | 310/64 |
| 5,091,666 | 2/1992 | Jarczynski | 310/64 |

*Primary Examiner*—R. Skudy
*Attorney, Agent, or Firm*—Antonelli, Terry, Stout & Kraus

[57] ABSTRACT

A machine assembly (10) of a first metallic part (22) having a first coefficient of thermal expansion which is mounted within a second metallic part (12) having a second coefficient of thermal expansion greater than the first coefficient of thermal expansion by an interference fit between surfaces of the parts with the first part having an outer cylindrical surface (44) and a second part having an inner cylindrical surface (24) prior to mounting with the interference fit between the surfaces in accordance with the invention includes at least three projections (26) projecting radially from one of the cylindrical surfaces at at least three equally spaced apart locations on a periphery of the cylindrical surface from which the projections project which extend axially along the one cylindrical surface with the projections forming the interference fit between the surfaces at points of contact with another of the surfaces; and wherein, the machine assembly has an operating temperature range extending from a lower temperature ($-65°$ F.) to an upper temperature ($450°$ F.) with the interference fit holding the surfaces at the upper temperature with a minimum of inward radial deflection of the inner surface between the projections and the interference fit holding the surfaces at the lower temperature with the inner surface deflecting radial inward between the projections in response to stress produced by a difference in the coefficients of thermal expansion.

23 Claims, 3 Drawing Sheets

DYNAMOELECTRIC MACHINES WITH STATOR POSITIONING

DESCRIPTION

1. Technical Field

The present invention relates to machine assemblies having concentric parts having different coefficients of thermal expansion which are concentrically mounted together by an interference fit and, more particularly, to the positioning of a stator within a housing of a dynamoelectric machine.

2. Background Art

The Assignee of the present invention manufactures integrated drive generators (IDG) which convert a variable speed shaft output from an airframe propulsion engine into a constant speed drive for driving a self-excited electrical power generator which generates three phase 400 Hz. power. An IDG includes a main generator and an exciter which each have a rotor mounted on a single shaft with each rotor being magnetically linked to a stator manufactured from iron laminations. The stator assembly is retained within an outer housing manufactured from a lightweight material such as a magnesium alloy. The magnesium alloy housing of the IDG is advantageous for lessening the overall weight of the IDG which is an important consideration from the standpoint of operational efficiency of an airframe.

An IDG has an operating temperature range typically extending from $-65°$ F. to $+450°$ F. over which the stator must be retained within the magnesium housing without angular or axial movement. Thin wall magnesium alloy housings have a problem with thermal growth opening a radial gap between the ferrous stator and the housing as a consequence of the magnesium alloy having a much higher thermal coefficient of expansion than the iron stator. The operating range of the IDG results in a thermal growth mismatch which is too large and the strength of the magnesium alloy is too low to ensure radial contact between the stator and the housing throughout the temperature operation range without the use of a retaining mechanism.

Current designs of IDGs manufactured by the Assignee utilize radial bolts which are attached through holes in the housing to the ferrous stator of the main generator and the ferrous stator of the exciter to maintain localized contact over the operating temperature range. The bolts are equally spaced around the circumference of the housing with a 120° separation to uniformly align and retain the stators of the main generator and the exciter.

The use of fasteners to retain the stators of a main generator and an exciter of an IDG within a magnesium alloy housing has disadvantages. In the first place, the required boring of the housing and the stator and the tapping to receive fasteners adds complexity to the manufacturing process and further expense and must be sealed individually to prevent overboard leaks. Additionally, the mounting of the stators within the housing requires the fixing of the stators relative to the housing during mounting to permit alignment of the fasteners within the holes in the housing and the corresponding tapped holes in the stator.

Other mechanisms are known for positioning the stator of a dynamoelectric machine within a housing. U.S. Pat. Nos. 2,151,561, 2,632,861, 4,134,036, 4,520,284, 4,663,553 and 4,894,574 disclose various mechanisms for positioning stators within the housings of dynamoelectric machines. None of the stator positioning systems disclosed in the aforementioned patents utilizes an interference fit directly between surfaces of a housing and a stator core at spaced apart locations which extend axially along and project radially from one of the cylindrical surfaces with the projections forming the interference fit between the surface at points of contact with another of the cylindrical surfaces and with stress being relieved by dissimilar coefficients of thermal expansion of the materials from which the housing and stator are manufactured by radial deflection of one of the cylindrical housings in between the points of contact on the cylindrical surfaces which form the interference fit. U.S. Pat. Nos. 2,632,861, 4,134,036, 4,663,533 and 4,894,574 rely upon intermediate structures between the housing and the stator to complete the mounting of the stator within the housing. U.S. Pat. No. 4,520,284 discloses the mounting of a non-cylindrical stator within a non-cylindrical housing by an interference fit. U.S. Pat. No. 2,151,561 discloses the mounting of a stator within a housing utilizing a radially inwardly extending projection in the housing which is aligned with a corresponding slot in the stator. The system of the '561 patent does not address the effects of differing coefficients of thermal expansion.

DISCLOSURE OF INVENTION

The present invention provides an improved machine assembly of a cylindrical housing and an inner cylindrical part, such as the stator of a dynamoelectric machine, which is retained in the housing by an interference fit with the housing being made from a material having a different coefficient of thermal expansion than the inner cylindrical part. The invention utilizes at least three equally spaced projections which project radially inward from the inner cylindrical surface of the housing or radially outward from an outer cylindrical surface of the inner cylindrical part at nominally equally spaced locations on a periphery of the cylindrical surface from which the projections project. The projections extend axially along the one cylindrical surface with the projections forming an interference fit between the one cylindrical surface and points of contact with the other cylindrical surface.

The machine has an operating temperature range extending from a lower temperature to an upper temperature such as $-65°$ F. to $450°$ F. with the interference fit holding the surfaces against relative movement between the upper and lower temperatures. Preferably, when the invention is utilized in an integrated drive generator, such as the type having an outer magnesium housing and a stator formed from iron laminations from which the projections project radially outward which is retained in the housing, the interference fit retains the stator at the upper temperature range. The interference fit holds the surfaces at the lower temperature with the inner surface deflecting more radially inward between the projections in response to stress produced by a difference in the coefficients of thermal expansion.

Alternatively, if the invention is practiced with the housing having a thermal coefficient of expansion which is less than the thermal coefficient of expansion of the inner cylinder, outward radial deflection of the inner cylinder occurs relative to the projections at the upper temperature and a minimum outward radial deflection of the inner housing relative to the projections occurs at the lower temperature.

The preferred position of the projections is radially outward from the outer surface of the inner cylindrical part of the assembly. Preferably each lamination of a stator has at least three radially outward extending projections which form the interference fit with the inner cylindrical surface of the housing. The projections may extend axially along a part or a full length of the stator. Furthermore, if the projections extend only partially along the stator, the projections may extend equally axially outward from a midline of the stator or, alternatively, be positioned asymmetrically with respect to the midline of the stator.

A machine assembly of a first metallic part having a first coefficient of thermal expansion which is mounted within a second metallic part having a second coefficient of thermal expansion greater than the first coefficient of thermal expansion by an interference fit between surfaces of the first and second metallic parts with the first metallic part having an outer cylindrical surface and the second metallic part having an inner cylindrical surface prior to mounting with the interference fit between the surfaces in accordance with the invention includes at least three projections projecting radially from one of the inner and outer cylindrical surfaces from at least three equally spaced apart locations on the one of an inner and outer cylindrical surface from which the projections project which extend axially along the one of the inner and outer cylindrical surface with the projections forming the interference fit at points of contact of the projections with another of the inner and outer surfaces surfaces; and wherein the machine assembly has an operating temperature range extending from a lower temperature to an upper temperature with the interference fit holding the inner and outer cylindrical surfaces at the upper temperature with a minimal inward radial deflection of the inner cylindrical surface between adjacent projections and the interference fit holding the inner and outer surfaces at the lower temperature with the inner cylindrical surface deflecting substantially radially inward between the adjacent projections in response to stress produced by a difference in the coefficients of thermal expansion. The machine assembly may be a dynamoelectric machine and, preferably, is an integrated drive generator or APU generator. The projections preferably project radially outward from the first part and are outer radial extensions of laminations of a stator. The projections extend either axially completely along a full length of the stator or, alternatively, extend axially partially along a full length of the stator.

Preferably, the first part is an outer housing formed from a magnesium alloy which is nonferrous; and the second part is a stator of a main generator within an integrated drive generator. The operating temperature range may be from −65° F. to 450° F. The surfaces are in contact at the lower temperature range between the adjacent projections.

BEST MODE FOR CARRYING OUT THE INVENTION

Figure 1:
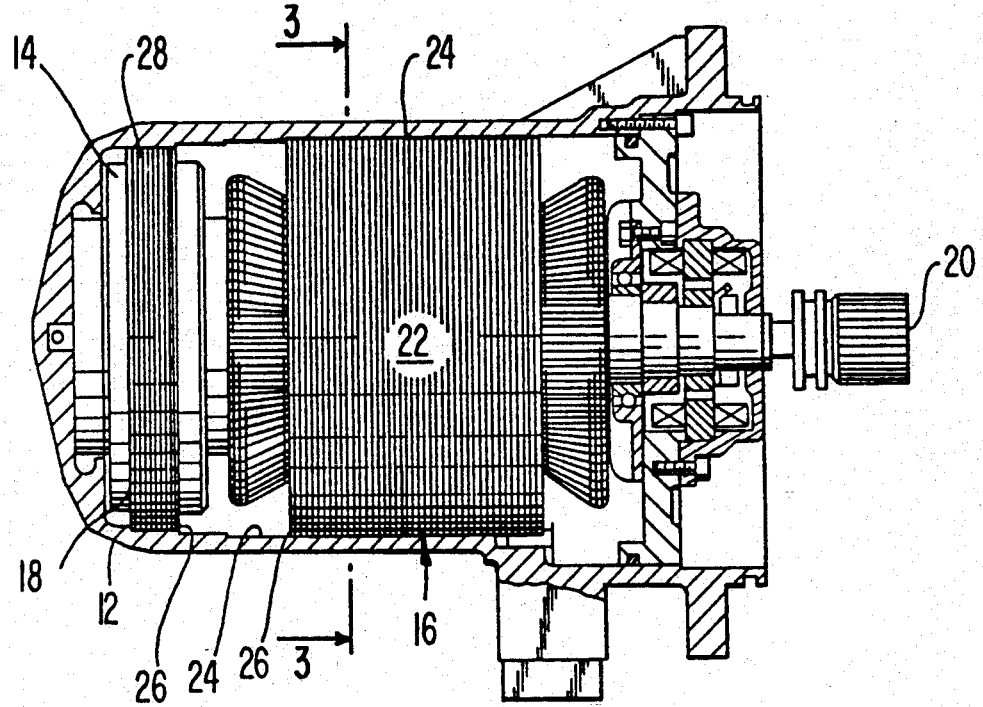
FIG. 1 illustrates a cross-sectional view of an integrated drive generator in accordance with the present invention.

FIGS. 1-6 illustrate a preferred embodiment of the present invention which is an integrated drive generator (IDG) 10 used for generating three phase 400 Hz. electrical current in an airframe from a power takeoff from a propulsion engine. Like reference numerals identify like parts in FIGS. 1-6. While the preferred embodiment of the present invention is an IDG, it should be understood that the present invention may be practiced with the mounting of first and second metallic parts having different coefficients of thermal expansion in which the first part has an outer cylindrical surface and the second part has an inner cylindrical surface prior to mounting with an interference fit between the surfaces. With the invention, the potential for overboard leaks is eliminated, the cost of manufacturing is reduced in comparison to the prior art methods of the Assignee which relied upon the use of fasteners to retain the stator within the housing of an IDG and further the overall assembly is simplified by relying upon an interference fit formed with projections from one of the cylindrical surfaces into contact with the other of the cylindrical surfaces at equally spaced locations around the periphery of the surfaces.

FIG. 1 illustrates a sectional view of an IDG 10 having an outer housing 12 which may be formed from a magnesium alloy in accordance with conventional practice utilized by the Assignee of the present invention. The IDG housing 12 contains a permanent magnet generator (not illustrated), an exciter 14 and a main generator 16. The operation of the permanent magnet generator, exciter 14 and main generator 16 is conventional and does not form part of the present invention. The exciter 14 has a stator 18 which is formed from a plurality of iron laminations 28 into a magnetically permeable core as described below with reference to FIG. 2 and a rotor (not illustrated) which is driven by shaft 20. The main generator 16 has a stator 22 which is formed from a plurality of iron laminations 28 into a magnetically permeable core as described below with reference to FIG. 2 and a rotor 25 (not illustrated) which is driven by the shaft 20. Suitable bearings rotatably support the shaft 20 within the housing 12 for rotatably driving the rotors of the exciter 14 and main generator 16. The exciter 14 and main generator 16 each have conventional windings which do not constitute part of the present invention. The stator 18 of the exciter 14 and the stator 22 of the main generator 16 are mounted within an inner cylindrical surface defined by the interior surface of the housing 12.

The mounting of the stators 18 and 22 is by an interference fit between at least three projections 26 projecting radially outward from the outer radius of the laminations 28 which form the stators. The projections 26 are outer radial extensions of the stators 18 and 22. The at least three projections are nominally equally spaced apart on a periphery of the outer cylindrical surface of the stators as described below with reference to FIG. 2.

The metal from which the housing 12 is formed, which typically is a magnesium alloy, has a first coefficient of thermal expansion which is greater than the second coefficient of thermal expansion of the iron laminations 28 from which the stators 18 and 22 are formed. The IDG 10 has an operating range without limitation of −65° F. to approximately +450° F. The lower temperature of −65° F. is the cold starting temperature at which an airframe is designed to be started in arctic regions and the higher temperature of +450° F. is the upper limit at which the IDG operates and may need to have sustained operation at more like 320° F. As a result of the large temperature swing between the lower temperature and the higher temperature, the larger coefficient of thermal expansion of the housing 12 produces greater thermal growth of the housing over the operating range than the corresponding thermal growth of the individual laminations 28. As a result, the diameter of the inner cylindrical surface 24 of the housing 12 increases more than the outer diameter of the stators 18 and 22 which requires that special consideration be given to retaining the stators 18 and 22 in the housing. As will be described below, the mounting with an interference fit between the outer radial projections 26 of the laminations 28 and the inner cylindrical surface 24 of the housing 12 provides a mechanism for relieving strain over the aforementioned temperature operating range of the IDG lo which is mechanically simple, low cost and reliable. The mechanism of stress relief is discussed below with reference to FIGS. 5 and 6.

Figure 2:
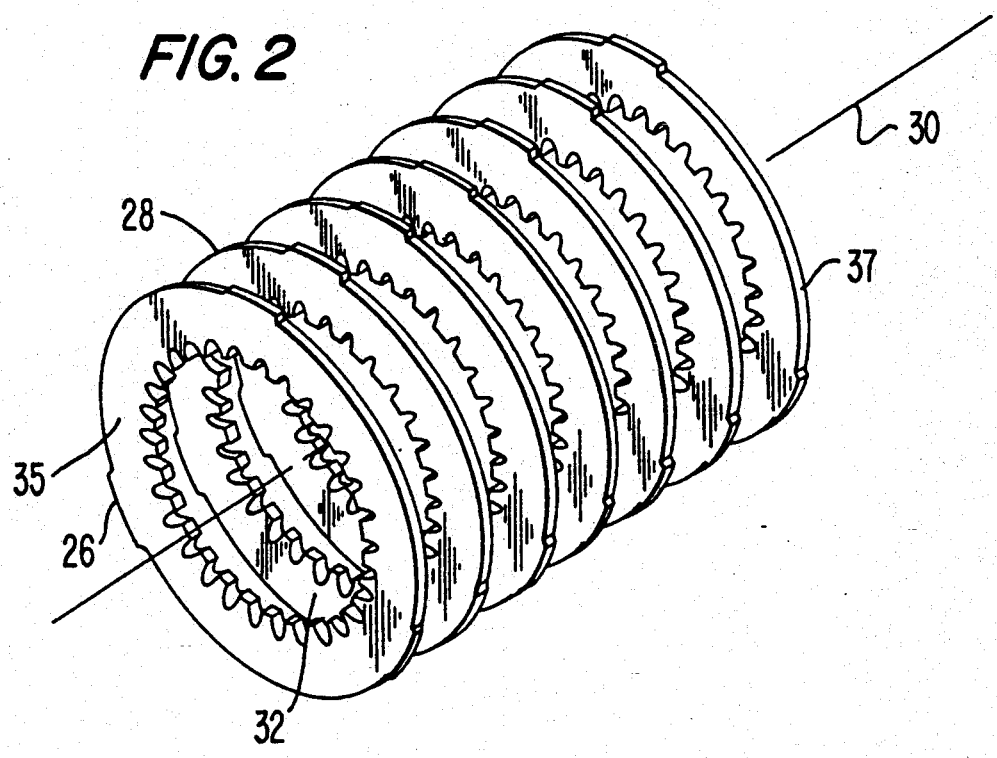
FIG. 2 illustrates an exploded view of the stator assembly of either a main generator or an exciter of the integrated drive generator of FIG. 1.

FIG. 2 illustrates an exploded view of the individual laminations 28 of the stators 18 and 22 of the exciter 14 and the main generator 18 respectively. The projections 26 are equally spaced around the outer periphery of the individual laminations 28. Preferably, three equally spaced projections are spaced apart at 120° intervals around the outer periphery of the individual laminations 28. However, it should be understood that more than three projections may be utilized especially if a tighter fit of the stators within the housing is necessary than could be provided with the use of three projections 26 which are force fit within the interior cylindrical surface 24 of the housing 12. The radius of the projections 26 extending outward from the radius of the laminations 28 at angular positions between the projections 26 may be varied depending upon the dimensions of the IDG and the torque load which the mounting is rated. For example, without limitation, the radius of the projections 26 may be 0.030 inch greater than the radius of the outer periphery of the laminations 28. The radial interference between the individual projections 26 and the interior surface 24 of the housing 12 may be between 0.0085 and 0.0105 inch. The individual projections 26 are ground or machined to a closely controlled diameter to insure the accuracy of the interference fit.

The individual projections 26 axially extend along the axis 30 of a bore 32 of the stator. The extension of the individual projections 26 may be along the full length or along a part of the full length of the stator. If the main generator extends substantially along the length of the housing 12, compensation should be provided for axial growth resultant from the difference in the coefficients of thermal expansion of the housing 12 and the iron from which a stator is formed. When the stator of a main generator 22 takes up a substantial portion of the overall length of the housing 12, the projections 26 may be eliminated from a number of the laminations 28 on either both ends 35 and 37 of the stator symmetrically with respect to the centerline of the stator or asymmetrically with respect to the centerline such that the projections are machined away from only one of the ends. The degree to which the axial extension of the projections 26 is reduced to reduce axial stress to accommodate for axial growth resultant from the mismatch of the coefficients of thermal expansion of the housing 12 and the stators 18 and 22 is determined by the overall dimensions of the IDG 10. The machining of material from the outer radius of the projections to limit the extension of the projections 26 along the axis 30 is only that which is necessary to eliminate the interference fit.

Figure 3:
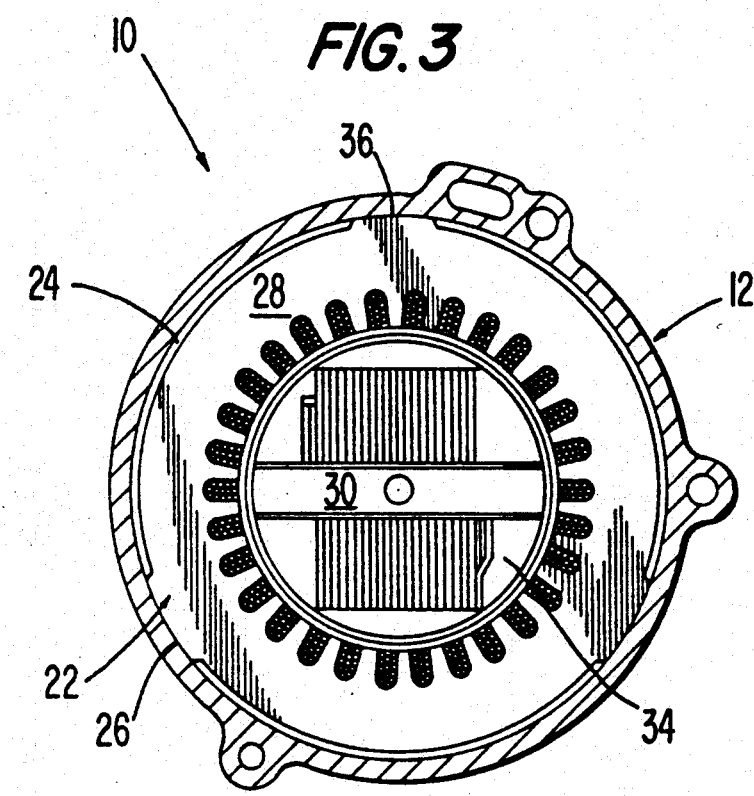
FIG. 3 illustrates a sectional view of FIG. 1 taken along section lines 3—3.
Figure 4:
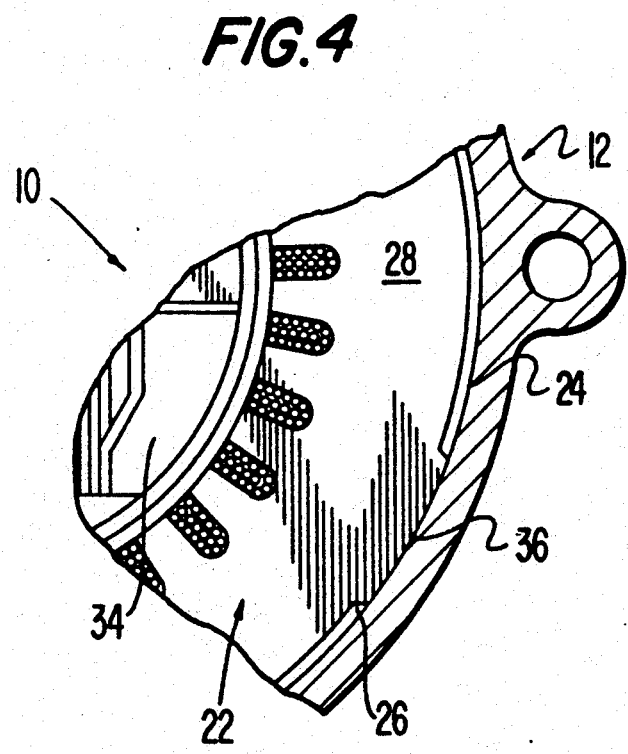
FIG. 4 illustrates an enlarged view of one of the projections of FIG. 3.

FIG. 3 illustrates a sectional view of FIG. 1 taken along section lines 3—3 and FIG. 4 illustrates an enlarged fragmentary view of FIG. 3. The interior of the stator 22 and rotor 34 are conventional and therefore are not discussed herein in detail. The projections 26 of the laminations 28 form an interference fit with the housing 12 at an aligned peripheral position 36 with the projections. An aligned peripheral position 36 is the point of contact of the inner cylindrical surface 24 of the housing 12 at which the interference fit is formed with the projections 26. It should be noted that the housing 12 is deformed by mounting of the stators 18 and 22 within the housing causes localized distortion at the aligned peripheral positions 36 of the housing. The housing 12 is deformed less between adjacent aligned peripheral positions 36 by the mounting of the stators 18 and 22 within the housing.

Figure 5:
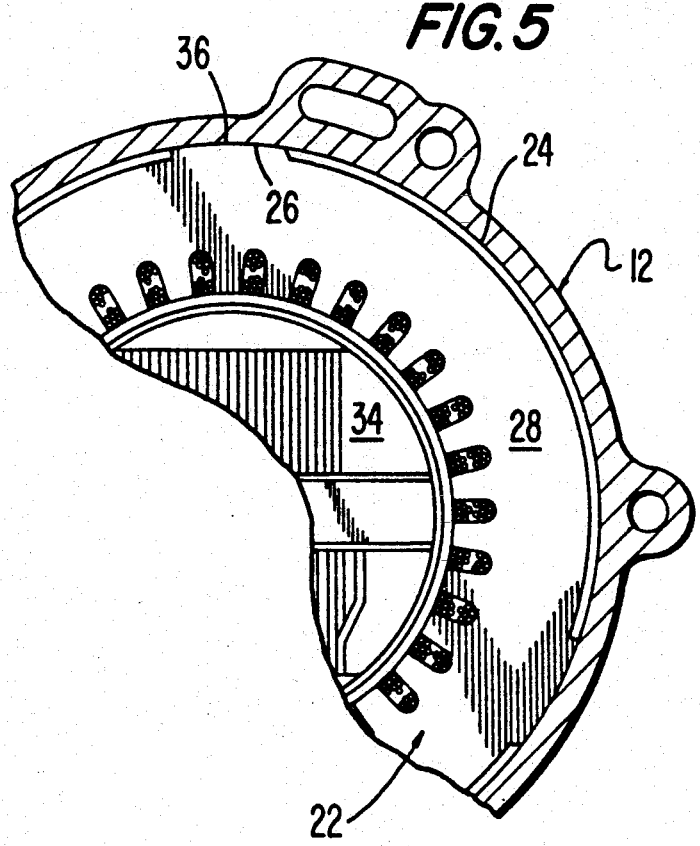
FIG. 5 illustrates a fragmentary view of the integrated drive generator of FIG. 1 at the upper operating temperature at which the housing contacts the stator at the projections of the stator where the interference fit is formed between the stator and the housing with a minimum radial deflection.
Figure 6:
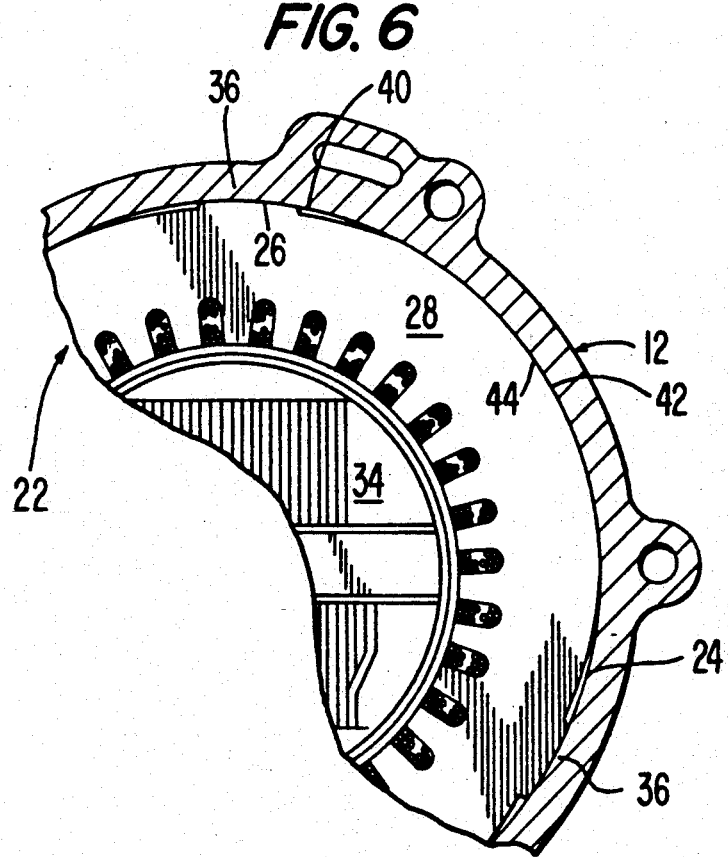
FIG. 6 illustrates the integrated drive generator of FIG. 1 at the lowest operating temperature at which the housing contacts the stator at the projections and approaches contact between adjacent projections on the stator.

FIGS. 5 and 6 respectively illustrate partial sectional views of the IDG 10 of FIG. 1 taken along section lines 3—3 which respectively illustrate the geometry of the housing 12 and the stator 22 for the upper and lower temperatures of the operating range of the IDG which may be without limitation −65° F. to 450° F. FIG. 5 illustrates the IDG 10 at an elevated temperature range such as 450° F. at which the greater thermal growth of the housing 12 which may be of material, such as in a magnesium alloy, minimally distorts the inner cylindrical surface 24. At the upper temperature with the interference fit between the projections 26 and the inner surface 24 of the housing 12 at the positions 36 there is a minimal inward radially deflection of the inner surface between adjacent positions 36 which as illustrated are 120° apart. FIG. 6 illustrates the operation of the IDG 10 at the lower temperature of the operating range, such as −65° F. at which the inner surface 24 of the housing 12 is deflected radially inward between the positions 36. The radially inward deflection of the inner surface 24 at the lower operating temperature is apparent by inspecting the spacing between the inner surface at a point 40 adjacent to the position 36 angularly aligned with the projection 26 and the spacing between the inner surface and a point 42 midway between the points 36. At lower temperatures, the shrinkage of the housing 12 caused by a relatively high coefficient of thermal expansion causes a radially inward deflection as a consequence of the fixing of the housing at the three points 36 where the interference fit occurs. This shrinkage relieves the stress which is produced by the difference in the coefficients of thermal expansion. As illustrated, the inner surface 24 of the housing 12 approaches the outer surface 44 at least at areas adjacent to the midpoint 42.

While a preferred embodiment of the invention is as illustrated in FIGS. 1–6, it should be understood that numerous modifications may be made thereto without departing from the spirit and scope of the invention. For example, the projections 26 may be formed on the inner surface 24 of the housing 12 to project radially inward. Furthermore, the length of the projections along the axis 30 as described above may be varied symmetrically with respect to the centerline to be less than the full length of the stator or varied asymmetrically to provide sufficient stress relief for thermal growth in the axial direction caused by the difference in the coefficients of thermal expansion between the stator and the interior surface 24 of the housing 12.

The invention may be also practiced with the housing having a coefficient of thermal expansion which is less than the material from which the inner cylindrical part is formed which is mounted by an interference fit between the outer surface of the interior cylindrical part and an inner cylindrical surface of the housing. In this situation, the radial deflection would be opposite to that described in FIGS. 5 and 6 such that radially outward deflection of the inner cylindrical part would occur at the upper temperature of the operating range. In this situation, the points on the outer surface 44 on the stators 18 and 22 between the projections 26 are closer to the surface midpoint 42 than points 40 on the stators adjacent to the projections 26 as illustrated in FIG. 6. At the lower temperature, the spacing between the stators 18 and 22 and the housing 12 is uniform around the periphery of the assembly as illustrated in FIG. 6.

Furthermore, while a preferred embodiment of the present invention is for assembling dynamoelectric machines having a stator mounted within a housing by an interference fit, it should be understood that the present invention may be practiced in diverse applications which are not limited to dynamoelectric machines.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A machine assembly of a first metallic part having a first coefficient of thermal expansion which is mounted within a second metallic part having a second coefficient of thermal expansion greater than the first coefficient of thermal expansion by an interference fit between surfaces of the first and second metallic parts with the first metallic part having an outer cylindrical surface and the second metallic part having an inner cylindrical surface prior to mounting with the interference fit between the surfaces comprising:
    at least three projections projecting radially from one of the inner and outer cylindrical surfaces from equally spaced apart locations on a periphery of the one of the inner and outer cylindrical surface from which the projections project which extend axially along the one of the inner and outer cylindrical surface with the projections forming the interference fit at points of contact of the projections with another of the inner and outer cylindrical surfaces; and wherein
    the machine assembly has an operating temperature range extending from a lower temperature to an upper temperature with the interference fit holding the inner and outer cylindrical surfaces at the upper temperature with a minimum of inward radial deflection of the inner cylindrical surface between the projections and the interference fit holding the inner and outer cylindrical surfaces at the lower temperature with the inner cylindrical surface deflecting radially inward between the projections with a radial deflection greater in response to stress produced by a difference in the coefficients of thermal expansion.

2. A machine assembly in accordance with claim 1 wherein:
    the machine assembly is dynamoelectric machine.

3. A machine assembly in accordance with claim 2 wherein:
    the machine assembly is an integrated drive generator.

4. A machine assembly in accordance with claim 1 wherein:
    the projections project radially outward from the first metallic part.

5. A machine assembly in accordance with claim 4 wherein:
    the projections are outer radial extensions of laminations of a stator.

6. A machine assembly in accordance with claim 5 wherein:
    the projections extend axially along a length of the stator.

7. A machine assembly in accordance with claim 5 wherein:
    the projections extend axially partially along a length of the stator.

8. A machine assembly in accordance with claim 2 wherein:
    the projections project radially outward from the first metallic part.

9. A machine assembly in accordance with claim 8 wherein:
    the projections are outer radial extensions of laminations of a stator.

10. A machine assembly in accordance with claim 9 wherein:
    the projections extend axially along a length of the stator.

11. A machine assembly in accordance with claim 9 wherein:
    the projections extend axially partially along a length of the stator.

12. A machine assembly in accordance with claim 3 wherein:
    the projection project radially outward form the first metallic part.

13. A machine assembly in accordance with claim 12 wherein:
    the projections are outer radial extensions of laminations of a stator.

14. A machine assembly in accordance with claim 13 wherein:
    the projections extend axially along a length of the stator.

15. A machine assembly in accordance with claim 13 wherein:

the projections extend axially partially along a length of the stator.

16. A machine assembly in accordance with claim 13 wherein:
the first metallic part is an outer housing formed from a magnesium alloy; and
the second metallic part is a stator of a main generator within the integrated drive generator.

17. A machine assembly in accordance with claim 1 wherein:
the surfaces are in contact at the lower temperature between the projections.

18. A machine assembly in accordance with claim 5 wherein:
the surfaces are in contact at the lower temperature between the projections.

19. A machine assembly in accordance with claim 6 wherein:
the surfaces are in contact at the lower temperature between the projections.

20. A machine assembly in accordance with claim 7 wherein:
the surfaces are in contact at the lower temperature between the projections.

21. A machine assembly in accordance with claim 1 wherein:
the first part is a stator and the second part is a housing containing the stator and is formed from a nonferrous material.

22. A machine assembly in accordance with claim 21 wherein:
the second part is formed from a magnesium alloy and the assembly is an integrated drive generator.

23. A machine assembly of a first metallic part having a first coefficient of thermal expansion which is mounted within a second metallic part having a second coefficient of thermal expansion less than the first coefficient of thermal expansion by an interference fit between surfaces of the first and second metallic parts with the first metallic part having an outer cylindrical surface and the second metallic part having an inner cylindrical surface prior to mounting with the interference fit between the surfaces comprising:
at least three projections projecting radially from one of the inner and outer cylindrical surfaces from equally spaced apart locations on a periphery of the one of the inner and outer cylindrical surface from which the projections project which extend axially along the one of the inner and outer cylindrical surface with the projections forming the interference fit at points of contact of the projections with another of the inner and outer cylindrical surfaces; and wherein:
the machine assembly has an operating temperature range extending from a lower temperature to an upper temperature with the interference fit holding the inner and outer cylindrical surfaces at the upper temperature with outward radial deflection of the outer cylindrical surface between the projections which is greater than outward radial deflection of the inner surface so that the inner and outer cylindrical surfaces are closer together at points between the projections than adjacent the projections occurring in response to stress produced by a difference in the coefficients of thermal expansion and the interference fit holding the inner and outer cylindrical surfaces at the lower temperature with the outer surface deflecting radially outward between the projections to be closer to the inner surface at points between the projections than adjacent the projections.

* * * * *